3,814,700
METHOD FOR CONTROLLABLY VARYING THE ELECTRICAL PROPERTIES OF NEMATIC LIQUIDS AND DOPANTS THEREFOR
Arieh Aviram, Yorktown Heights, and Ivan Haller, Chappaqua, N.Y., Robert D. Miller, San Jose, Calif., and William R. Young, Mount Kisco, N.Y., assignors to International Business Machines Corporation, Armonk, N.Y.
No Drawing. Filed Aug. 3, 1972, Ser. No. 277,535
Int. Cl. G02f 1/16
U.S. Cl. 252—408   6 Claims

ABSTRACT OF THE DISCLOSURE

There is disclosed herein a method for controllably varying the electrical properties of nematic liquids over a relatively large range by using as dopants for the nematic liquids organic materials that provide ions in which the charge is distributed over several atoms and is shielded from the charge of the counterions by a nonpolar shell. In addition, there are disclosed novel materials which can be advantageously employed as dopants in the method. The dopant materials can be conveniently divided into two classes: (1) compounds consisting of large organic ions or precursors for large organic ions; and (2) complex ions of an alkali metal and a chelating agent. The dopant materials result in ions in which the charge is distributed over several atoms and have sufficient nonpolar groups to insure their solubility in a low-dielectric constant liquid (the nematic liquids), i.e., a dielectric constant of 1–20.

BACKGROUND OF THE INVENTION

This invention relates to nematic liquids. More particularly, it relates to a method for variably controlling the electrical properties of these liquids, and novel materials for use as additives to the nematic liquids in such method.

In the employment of nematic liquid crystal materials in dynamic scattering type display devices, the dynamic scattering is provided by the turbulent flow of the nematic liquid crystal which is induced by viscous drag on ions moving under the influence of an electric field. Important operating characteristics of the display device such as threshold voltage, cut-off frequency and power dissipation depend upon the conductivity and the conductivity anisotropy of the nematic liquid. It is believed that these characteristics are determined, in turn, by the concentration of ions, their mobilities, their shape anisotropies and by the ability of the nematic liquid to have charge injected thereinto by electrodes.

It is known that pure nematic liquid crystals lack sufficient charge carriers to exhibit dynamic scattering. Accordingly, heretofore, the necessary ions to provide dynamic scattering have been provided by the chemical degradation of the nematic liquid, an example of the latter phenomenon being the hydrolysis of the nematic liquid crystal material p-methoxybenzylidene - p - butylaniline. However, such degradation has produced irreproducible and essentially irreversible results.

To overcome the deficiencies of the degradation procedure, there have been attempted the use of dopants, i.e., additives for the nematic liquid, in an attempt to enable the control of the production of charge carriers. In this connection, quaternary ammonium halides have been used as dopants for the aforementioned nematic crystal material, p-methoxybenzylidene-p-butylaniline. However, the use of these quaternary ammonium salts has produced only a slight effect on the conductivity of nematic liquids because of their poor solubilities and low electrolytic dissociation constants in the nematic liquids which are, by nature, low dielectric constant solvents.

Accordingly, it is an important object of this invention to provide a method for controllably varying the electrical properties of nematic liquids over a relatively large range of values.

It is another object to provide a method for controllably varying the electrical properties of nematic liquids over a relatively large range wherein dopants are provided for the nematic liquids that result in ions in which the charge is distributed over several atoms and is shielded from the charge of counterions by a nonpolar shell.

It is a further object to provide novel materials for use as dopants in the method of the preceding object.

SUMMARY OF THE INVENTION

In accordance with the invention, there is provided a method of controllably varying the electrical properties of nematic liquids. The method comprises the step of adding to the nematic liquids an organic dopant material which provides ions in which the charge is distributed over several atoms and is shielded from the charge of the counterions by a nonpolar shell. The added organic material is selected from the group consisting of a first class of compounds consisting of large organic ions a second class of compounds containing complex ions of an alkali metal and a chelating agent. The anions in the second class of the dopant materials are anions of either hydrobromic acid or of strong organic acids, i.e., having a $pK_a$ of 1 to 10 and which have sufficient nonpolar groups to insure solubility in a low dielectric constant liquid, i.e., with a dielectric constant of about 1 to 20.

Also, in accordance with the invention there are provided novel compounds for use as the organic dopant materials in the foregoing method.

The foregoing and other objects, features and advantages of the invention will be apparent from the more particular description of preferred embodiments of the invention.

DESCRIPTION OF PREFERRED EMBODIMENTS

It has been found that the electrical properties of nematic liquids can be varied over a large range by utilizing as dopants therefor organic materials that result in ions in which the charge is distributed over several atoms and which are shielded from the charge of counterions by a non-polar shell. The dopant materials that are effective for this purpose generally fall into two classes, viz., a first class comprising compounds which include large organic ions or precursors for large organic ions and a second class comprising compounds which contain complex ions of an alkali metal and a chelating agent.

Thus, for example, a 60:40 mixture of 4-butyl-4′-ethoxy-α-chlorostilbene and 4-octyl-4′-ethoxy-α-chlorostilbene which is a nematic liquid between 8° and 59° C. and has a resistivity $\rho$ of approximtaely $10^{12}$ ohm cm., does not, in itself, exhibit continuous dynamic scattering in one mil layers between transparent electrodes either under DC or AC excitation. It has been found that, when a material of the two above-mentioned classes (examples being enumerated under compound numbers 1 to 22 below) is added to this mixture under the conditions set forth, dynamic scattering occurs.

Typical examples of materials of the first class are those set forth in the table legended Class I.

CLASS I

Compound #: Name
1. N,N'-Dimethyldocosanylamine-n-tetracyano-quinodimethane complex
2. N-Butylpyridinium p-toluenesulfonate
3. N-Dodecylpyridinium p-toluenesulfonate
4. Hexaphenylethane
5. p-Methoxybenzylidene-p-butylaniline
6. Quinhydrone
7. Tetrabutylammonium tetraphenylboride
8. Tetramethyl-2,2,6,6-piperidinol-4-oxyle-1

Examples of materials in Class II are subdivided into three groups.

A first sub-group of the second class of compounds have the following formula

Dicyclohexyl-18-crown-6M$^+$X$^-$ wherein M$^+$ is a metal, suitably sodium or potassium, and X$^-$ is an anion. The structural formula for this first sub-group is as follows:

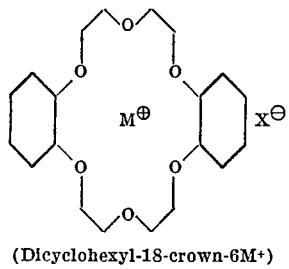

(Dicyclohexyl-18-crown-6M$^+$)

The anion X$^-$ may suitably be selected from the following group:

(1) An aliphatic carboxylate having the general structural formula

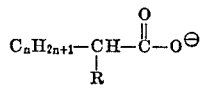

wherein $n$ may have a value of 4, 5, 6 or 7, and R is H, CH$_3$, or C$_2$H$_5$.

A typical example of a first sub-group compound having this ion is dicyclohexyl-18-crown-6 potassium 2-ethylhexanoate (compound #9) wherein the anion has the structure

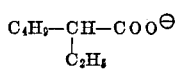

(2) An aromatic carboxylate having the general structural formula

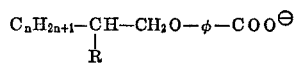

wherein $n$ may be 4, 5, 6 or 7, and R is H, CH$_3$ or C$_2$H$_5$.

A typical example of a first sub-group compound having this ion is dicyclohexyl-18-crown-6 potassium 2-ethylhexyloxybenzoate (compound #10) wherein the anion has the structure

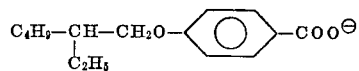

(3) A phosphate having the general structural formula

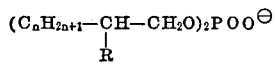

wherein $n=4$–7 and R=H, CH$_3$ or C$_2$H$_5$.

A typical example of a first sub-group compound having this ion is dicyclohexyl-18-crown-6 potassium di-(2-ethylhexyl) phosphate (compound #11) wherein the anion has the structure

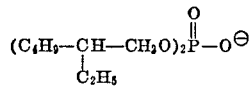

(4) A borate having the general structural formula $$(C_nH_{2n+1}-\phi)_4B^\ominus$$

wherein $n=0$ to 3.

A typical example of a first sub-group compound having this ion is dicyclohexyl-18-crown-6 sodium tetraphenylborate (compound #12) wherein the anion has the structure $$\phi_4B^\ominus$$

(5) A sulfate having the general structural formula $$C_nH_{2n+1}O-SO_2-O^\ominus$$

wherein $n=10$ to 18.

A typical example is the dicyclohexyl-18-crown-6 potassium salt (compound #13) of the anion which has the structure $$C_{12}H_{25}O-SO_2-O^\ominus$$

(6) A xanthate having the general structural formula

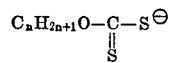

wherein $n=6$ to 12.

A typical example is the discyclohexyl-18-crown-6 potassium salt (compound #14) of the anion which has the structure

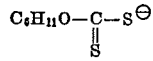

(7) A sulfonate having the general structural formula

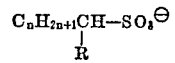

wherein $n=4$ to 7, and R=H, CH$_3$, or C$_2$H$_5$.

A typical example is the dicyclohexyl-18-crown-6K$^\oplus$ salt (compound #15) of the anion which has the structure

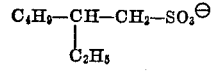

(8) A phenoxide having the general structural formula $$C_nH_{2n+1}O-\phi-CH=CH-\phi-O^\ominus$$

wherein $n=1$ to 5.

A typical example is the dicyclohexyl-18-crown-6 potassium salt (compound #16) of the anion which has the structure

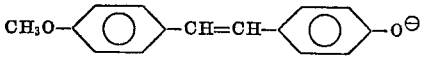

(9) A mercaptide having the structure

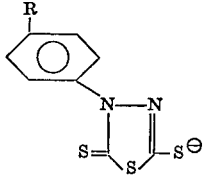

where R=H, $CH_3$ or $C_2H_5$.

A typical example of a first sub-group compound containing this anion is dicyclohexyl-18-crown-6 potassium 3-phenyl-1,3,4-thiadiazole - 2 - thione-5-mercaptide (compound #17).

A further example of a compound of the first sub-group is dicyclohexyl-18-crown-6 potassium thiocyanate (compound #18).

A second sub-group of the above-mentioned second class of compounds contain cations of potassium or sodium complexed by dibenzo-18-crown-6 ether, particular examples being:

Dibenzo-18-crown-6 potassium thiocyanate (compound #19) and

Dibenzo-18-crown-6 sodium tetraphenylboride (compound #20).

A third sub-group of the above-mentioned second class of compounds are the following:

Tributylphosphine oxide lithium bromide (compound #21) and

Triphenylphosphine oxide lithium bromide (compound #22).

In carrying out the invention, an appropriate amount of dopant in the quantity of 0.01 to 5% by weight of the total nematic liquid-dopant mixture is placed in a vial. To the dopant, there is added the proper amount of nematic liquid. The contents of the vial are now heated with stirring to the point of isotropic transition. Thereafter, the heated mixture is permitted to cool to room temperature and the cooled mixture is then filtered, preferably under vacuum, the filter advantageously being a medium coarseness sintered glass funnel.

Generally speaking, in accordance with the inventive method, the dopants can be used with all nematic liquids. Those nematic liquids that have found practical applications on the strength of exhibiting nematic phases in the vicinity of room temperature generally fall into the following four classes, viz:

1. Stilbenes
2. Schiff bases
3. Azoxybenzenes
4. Esters

The dopants were found to be effective for representative examples of all four classes.

Although all of the dopants set forth hereinabove are efficacious for their purpose of enabling the controllable varying of the electrical properties of nematic liquids, there are several novel compounds in the first sub-group which are particularly effective. These novel compounds are those wherein the cation is the alkali metal crown ether complex ion and wherein the anion is selected from the group consisting of the aliphatic carboxylate, the aromatic carboxylate, the mercaptide, the phosphate, the sulfate, the xanthate, the sulfonate and the phenoxide. There follows hereinbelow respective examples of syntheses of the crown ether compounds containing the foregoing anions.

Example 1.—Aliphatic carboxylate

The reaction for providing this compound is as follows:

Di-cyclohexyl-18-crown-6 ether +

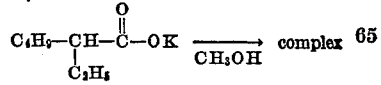

To carry out this reaction, there is evaporated on a rotary evaporator 20 ml. of a 50% aqueous solution of potassium 2-ethylhexanoate to a residue of a gummy consistency. To this residue, there are added 20 ml. of ethyl alcohol followed by an evaporation, and thereafter to the residue resulting from the latter evaporation, there are again added 20 ml. of ethyl alcohol followed by an evaporation. A quantity of 0.245 grams of the residue resulting from the second evaporation has added thereto 30 ml. of methyl alcohol, the resulting solution being added to 0.500 gram of crown ether in 30 ml. of methyl alcohol. The mixed solution is permitted to sit for a period such as about 12 hours and thereafter is evaporated on a rotary evaporator, the residue being dried in a vacuum desiccator using phosphorous pentoxide as a desiccant. The resulting 0.745 gram of crown ether-aliphatic carboxylate complex is a clear, brownish, viscous gum.

Example 2.—Aromatic carboxylate

The reactions for providing this compound are as follows:

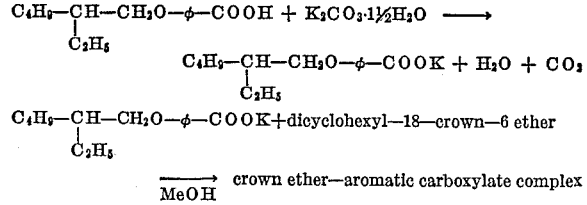

In carrying out the above reactions, there are employed 0.2 gram of the aromatic carboxylic acid and 0.132 gram of potassium carbonate to provide 0.23 gram of the potassium salt. In carrying out the reactions, the solid potassium carbonate is added to an ethanol solution of the acid. After the salt is formed, the solvent is removed by evaporation.

To form the complex, the same procedure is employed as set forth in Example 1.

Example 3.—Mercaptide

The reaction for providing this compound is as follows:

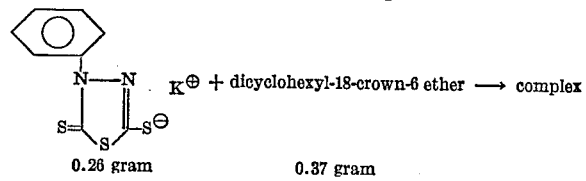

0.26 gram    0.37 gram

In carrying out the above reaction, each reagent was dissolved in 50 ml. of methanol. The two solutions are mixed and the resulting solution is warmed on a steam bath for about 45 minutes. Thereafter, the methanol is removed by a pump and 50 ml. of benzene are added. The benzene solution was boiled and filtered. The benzene is then removed by evaporation. There results a chartreuse viscous oil which is the desired complex.

Example 4.—Phosphate

The reactions for providing this compound are as follows:

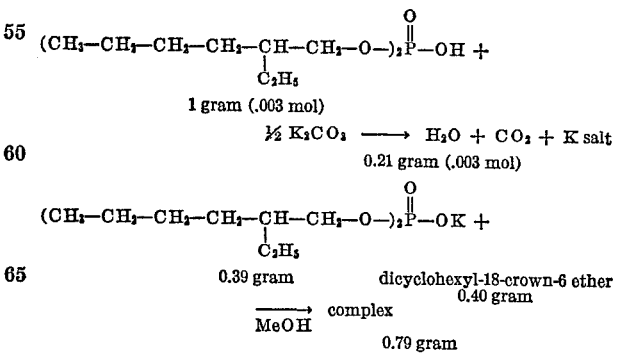

In forming the K salt, the phosphoric ester is dissolved in hot ethanol. To this solution, there is added the potassium carbonate dissolved in 2 ml. of $H_2O$. The resulting solution is heated to boiling at which point about 10 ml. of water are added and the boiling is continued until total solution results. Thereafter, solvents are removed by evaporation.

To form the complex, the same procedure is followed as in Example 3.

Example 5.—Sulfate

The reaction for providing this compound is as follows:

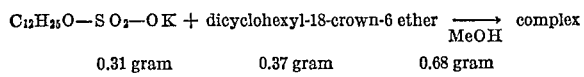

$C_{12}H_{25}O$—$SO_2$—$OK$ + dicyclohexyl-18-crown-6 ether $\xrightarrow{MeOH}$ complex 0.31 gram        0.37 gram                    0.68 gram The procedure is the same as that set forth in Example 3.

Example 6.—Xanthate

The reaction for providing this compound is as follows:

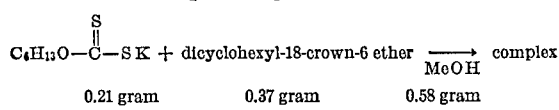

$C_4H_{13}O$—$\overset{S}{\overset{\|}{C}}$—$SK$ + dicyclohexyl-18-crown-6 ether $\xrightarrow{MeOH}$ complex 0.21 gram        0.37 gram                    0.58 gram In carrying out the above reaction, the two reagents are refluxed in 150 ml. of methanol. Thereafter, the methanol is removed by evaporation. To the residue, there are added 50 ml. of benzene. The benzene solution is filtered and the benzene is then removed from the filtrate to yield the xanthate which is a yellowish-brown gum.

Example 7.—Sulfonate

The reaction for providing this compound is as follows:

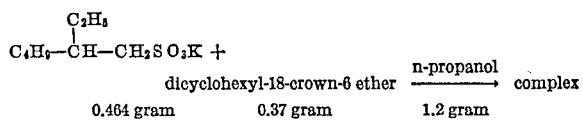

$C_4H_9$—$\overset{C_2H_5}{\overset{|}{CH}}$—$CH_2SO_3K$ + dicyclohexyl-18-crown-6 ether $\xrightarrow{n\text{-propanol}}$ complex 0.464 gram       0.37 gram                    1.2 gram In carrying out the above reaction, the reagents are refluxed overnight in 60 ml. of n-propanol. The solvent is then removed by evaporation to produce a solid residue. The residue is dissolved in 60 ml. of hot benzene. The benzene solution is filtered and the benzene is removed from the filtrate by evaporation to afford the complex.

Example 8.—Phenoxide

To provide this compound, the following reaction was carried out in methanol:

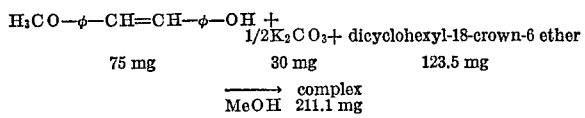

$H_3CO$—$\phi$—$CH=CH$—$\phi$—$OH$ + $1/2 K_2CO_3$ + dicyclohexyl-18-crown-6 ether $\xrightarrow{MeOH}$ complex 75 mg            30 mg                        123.5 mg                                 211.1 mg Thereafter, the reaction solution was treated as set forth in Example 3 to provide this compound which is a greenish oil.

The following is an example of the synthesis of compound #1 which is also a new compound.

Example 9.—N,N'-Dimethyl-n-docosanylamine-tetracyanoquinodimethane

The reaction for providing this compound is as follows:

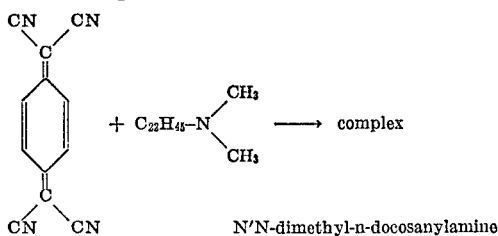

+ $C_{22}H_{45}$—$N\overset{CH_3}{\underset{CH_3}{\diagdown}}$ $\longrightarrow$ complex Tetracyanoquinodimethane   N'N-dimethyl-n-docosanylamine To carry out this reaction, 0.25 gram of the amine is dissolved in 25 ml. of boiling acetonitrite. Then, 0.289 gram of the quinone is added and the boiling is continued until all of the quinone is dissolved. Thereafter, the solution is cooled to $-25°$ C. whereupon a black solid crystallizes therefrom. The solution is filtered and the solid is recrystallized from acetonitrite (25 ml. at $-25°$ C.) to yield the desired material; with the above set forth reacting quantities the yield is 0.20 gram.

Another name for this compound is N,N'-Dimethyl-n-docosanylamine-2,5-cyclohexadiene - Δ-1,a:4,a'-dimalononitrile.

There now follows hereinbelow examples of the results achieved in controllably varying the electrical properties of nematic liquids utilizing the dopants set forth hereinabove according to the invention.

In this connection, there is provided in the following table the effects of certain of the dopants. The electrical properties set forth in the table are the conductivity, cut-off frequency and turn-on or threshold voltage for dynamic scattering. The nematic liquid utilized in determining these effects is a 60:40 mixture of 4-butyl-4'-ethoxy-α-chlorostilbene and 4-octyl-4'-ethoxy-α-chlorostilbene.

| | Concentration (percent by weight) | Conductivity ($\omega^{-1}$ cm.$^{-1}$) | Cut-off frequency (Hz.) | Threshold voltage for dynamic scattering (volts, RMS) |
|---|---|---|---|---|
| Compound #: | | | | |
| 1 | Saturated | $1 \times 10^{-8}$ | 2,000 | 9 |
| 7 | do | $1 \times 10^{-9}$ | 60 | 15 |
| 9 | 0.5 | $2 \times 10^{-8}$ | 350 | 7 |
| 9 | 5 | $1 \times 10^{-7}$ | 4,500 | 10 |
| 11 | Saturated | $5 \times 10^{-9}$ | 500 | 6 |
| 12 | do | $3 \times 10^{-9}$ | 500 | 15 |
| 18 | do | $6 \times 10^{-8}$ | 7,000 | 12 |
| 20 | do | $3 \times 10^{-10}$ | 300 | 12 |
| 21 | do | $1 \times 10^{-9}$ | 500 | 14 |
| Blank | 0 | $1 \times 10^{-12}$ | <5 | |

There follows, hereinbelow, further examples of tests made with the dopants according to the invention.

Example 1

A quantity of 1% of compound 12 was added to an experimental mixture of nematic esters. The conductivity increased from $1 \times 10^{-10}$ $\Omega^{-1}$ cm.$^{-1}$ to $2 \times 10^{-8}$ $\Omega^{-1}$ cm.$^{-1}$.

Example 2

A series of samples of varying concentrations of compound 15 was dissolved in the 60:40 mixture of 4-butyl-4'-ethoxy-α-chlorostilbene and 4-octyl-4'-ethoxy-α-chlorostilbene. The AC conductivity transverse to the alignment axis was carefully measured at room temperature. The conductivity as a function of concentration is shown below:

| Concentration (percent): | Conductivity ($\Omega^{-1}$ cm.$^{-1}$) |
|---|---|
| 0 | $<2 \times 10^{-12}$ |
| 0.05 | $4.8 \times 10^{-11}$ |
| 0.5 | $6.1 \times 10^{-10}$ |
| 1.3 | $2.3 \times 10^{-9}$ |
| 5.0 | $1.9 \times 10^{-8}$ |

Example 3

A quantity of 1% of compound 12 was added under anhydrous conditions to a freshly purified sample of p-methoxybenzylidene-p-n-butylaniline. The resistivity and cut-off frequency were found to be $3 \times 10^{-10}$ $\Omega^{-1}$ cm.$^{-1}$ and 120 Hz., respectively, compared to $3 \times 10^{-11}$ $\Omega^{-1}$ cm.$^{-1}$ and 12Hz. for the undoped liquid crystal.

Example 4

A quantity of 1% of compound 12 was dissolved in a distilled sample of Licristal Nematic Phase IV (trade name of E. Merck Company, Germany for an isomeric mixture of p-methoxy-p'-butylazoxybenzene). The resistivity and cut-off frequency were $7 \times 10^{-8}$ $\Omega^{-1}$ cm.$^{-1}$ and 40 KHz., compared to $3 \times 10^{-10}$ $\Omega^{-1}$ cm.$^{-1}$ and 270 Hz. of the pure material.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A method of controllably varying the electrical properties of nematic liquids comprising the step of:
utilizing in said liquids an organic dopant material which provides ions in which the charge is distributed over several atoms and is shielded from the charge of the counterions by a non-polar shell, said material being selected from the group consisting of a first class of compounds consisting of large organic ions or precursors of large organic ions and a second class of compound containing complex ions of an alkali metal and a chelating agent, and having sufficient non-polar groups to insure solubility in a low dielectric constant liquid.

2. A method as defined in claim 1 wherein said first class of compounds consists of dimethyldocosylamine-tetracyanoquinodimethane complex, N-butylpyridinium p-toluenesulfonate, N - dodecylpyridinium p - toluenesulfonate, hexaphenylethane, p - methoxybenzylidene-p-butylaniline, quinhydrone, tetrabutylammonium tetraphenylboride, and tetramethyl-2,2,6,6-piperidinol-4-oxyle-1.

3. A method as defined in claim 1 wherein said second class of compounds consists of a first sub-group of compounds having the general structure formula

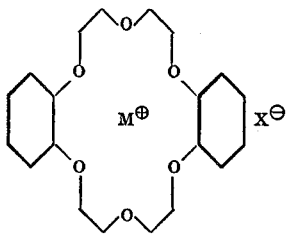

wherein M⊕ is an alkali metal ion selected from the group consisting of sodium and potassium and wherein X⊖ is an anion selected from the group consisting of an aliphatic carboxylate having the general structural formula

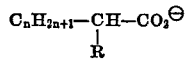

wherein $n=4$ to 7, R=H, CH$_3$ or C$_2$H$_5$, an aromatic carboxylate having the general structural formula

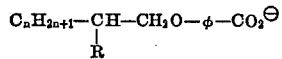

wherein $n=4$ to 7, R=H, CH$_3$ or C$_2$H$_5$, a phosphate having the general structural formula

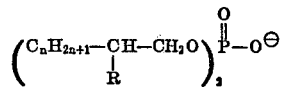

wherein $n=4$ to 7, R=H, CH$_3$ or C$_2$H$_5$, a sulfate having the general structural formula $$C_nH_{2n+1}\ O\!-\!SO_2\!-\!O^\ominus$$

wherein $n=10$ to 18, a xanthate having the general structural formula

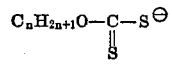

wherein $n=6$ to 12, a borate having the general structural formula $$(C_nH_{2n+1}\!-\!\phi)_4B^\ominus$$

wherein $n=0$ to 3, a sulfonate having the general structural formula

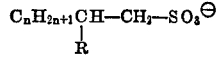

wherein $n=4$ to 7, R=H, CH$_3$ or C$_2$H$_5$, a phenoxide having the general structural formula $$C_nH_{2n+1}\ O\!-\!\phi\!-\!CH\!=\!CH\!-\!\phi\!-\!O^\ominus$$

wherein $n=1$ to 5, a mercaptide having the structural formula

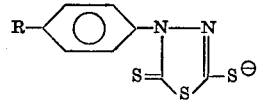

wherein R=H, CH$_3$ or C$_2$H$_5$, and the thiocyanate ion, a second subgroup consisting of dibenzo-18-crown-6-potassium thiocyanate and dibenzo-18-crown-6 sodium tetraphenylboride, and a third subgroup consisting of tributylphosphine oxide lithium bromide and triphenylphosphine oxide lithium bromide.

4. A method as defined in claim 3 wherein anions of said first subgroup consists of the aliphatic carboxylate

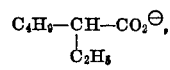

the aromatic carboxylate

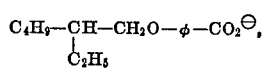

the phosphate

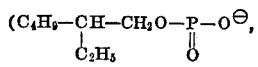

the sulfate $C_{12}H_{25}O\!-\!SO_2\!-\!O^\ominus$, the xanthate

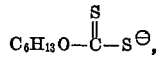

the borate $\phi_4B^\ominus$, the sulfonate

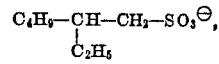

the mercaptide

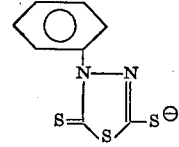

and the thiocyanate.

5. A method of controllably varying the electrical properties of nematic liquids comprising the step of:
incorporation into said liquids a dopant material having the following structural formula

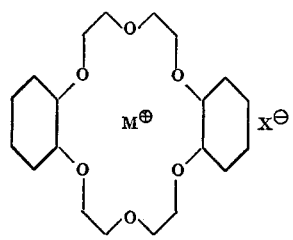

where M is an alkali metal ion selected from the group consisting of sodium and potassium and wherein X is a sulfonate having the general structural formula

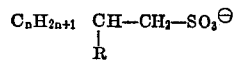

wherein $n=4$ to 7 and R=H, CH$_3$ or C$_2$H$_5$.

6. A material for use as a dopant for nematic liquids to enable the controllable varying of the electrical properties of said liquids comprising:
a compound having the following general structural formula

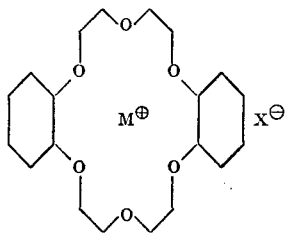

wherein M is selected from the group consisting of sodium and potassium and X is a sulfonate having the structural formula

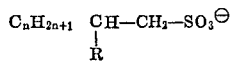

wherein $n=4$ to 7 and $R=H$, $CH_3$ or $C_2H_5$.

References Cited

UNITED STATES PATENTS 3,656,834  4/1972  Haller et al. _____ 350—150

JOHN D. WELSH, Primary Examiner

U.S. Cl. X.R.

252—500; 350—150